US012798074B2

(12) United States Patent
Perez et al.

(10) Patent No.: US 12,798,074 B2
(45) Date of Patent: Nov. 17, 2026

(54) ELECTRONIC TELESCOPING POLE

(71) Applicants: Luis Ramón López Perez, Hermosillo (MX); Fernando Camela Ramirez, Hermosillo (MX)

(72) Inventors: Luis Ramón López Perez, Hermosillo (MX); Fernando Camela Ramirez, Hermosillo (MX)

( * ) Notice: Subject to any disclaimer, the term of this patent is extended or adjusted under 35 U.S.C. 154(b) by 589 days.

(21) Appl. No.: 18/537,477

(22) Filed: Dec. 12, 2023

(65) Prior Publication Data

US 2024/0359308 A1 Oct. 31, 2024

Related U.S. Application Data

(60) Provisional application No. 63/462,193, filed on Apr. 26, 2023.

(51) Int. Cl.
*B25G 1/04* (2006.01)
*H02G 1/02* (2006.01)

(52) U.S. Cl.
CPC ................ *B25G 1/04* (2013.01); *H02G 1/02* (2013.01)

(58) Field of Classification Search
CPC ............... B25G 1/00; B25G 1/04; H02G 1/02
See application file for complete search history.

(56) References Cited

U.S. PATENT DOCUMENTS

| | | | | |
|---|---|---|---|---|
| 6,588,065 | B1 | 7/2003 | Tucker, III | |
| 9,009,921 | B1 * | 4/2015 | Ramsey | B25G 1/04 16/436 |
| 12,661,776 | B2 * | 6/2026 | Gannon | B25J 1/04 |
| 2017/0268700 | A1 * | 9/2017 | Farkas | F16M 11/28 |
| 2021/0285824 | A1 * | 9/2021 | Sanders | G01K 1/16 |

* cited by examiner

*Primary Examiner* — Gilbert Y Lee
(74) *Attorney, Agent, or Firm* — Hayes Soloway P.C.

(57) ABSTRACT

An electronic telescoping pole, includes a handle. A motor has a power source and is located within the handle. A plurality of nesting tubes is telescopically extendable from the handle. Each tube has a square rib support within the tube. At least one drive belt is in mechanical communication with the motor and the plurality of square rib supports. In a retracted position, the plurality of nesting tubes and square rib supports are nested, one within another. In an extended position, the at least one drive belt is operable upon the plurality of square rib supports to telescopically extend the plurality of nesting tubes.

20 Claims, 8 Drawing Sheets

Method Of Driving A Telescoping Pole

1000

ELECTRONIC TELESCOPING POLE

CROSS REFERENCE TO RELATED APPLICATION

This application claims priority from U.S. Provisional Application Ser. No. 63/462,193, filed Apr. 26, 2023 and titled "ELECTRONIC TELESCOPING POLE", the contents of which is incorporated herein by reference.

FIELD OF THE DISCLOSURE

The present disclosure is generally related to telescoping poles and more particularly is related to electronically-actuated telescoping poles.

BACKGROUND OF THE DISCLOSURE

In the electric power distribution industry, components are often serviced while electric power is flowing through them, a practice known as live-line working. Because the high-voltage energy in these components can be dangerous to utility workers, workers must maintain a safe distance and must remain electrically insulated from any components being serviced. Additionally, many transmission components are often stored on utility poles, high above ground level and out of reach of the general population.

Utility workers currently use electrically insulated poles, often called hot sticks, in order to reach and perform maintenance to electrical components while maintaining a safe distance and remaining electrically insulated from the components. Hot sticks may have a fixed length or may comprise nested telescoping sections that allow the hot stick to extend to various lengths. Utility workers are required to manually adjust the pole sections by various methods, including friction fitting, button pin locks, polarized or shaped poles, and the like.

Current hot sticks suffer from several problems. First, telescoping hot sticks require manual extension of the poles, which requires the utility worker to stop work, have both hands free, and manipulate the hot stick, usually while wearing heavy personal protective equipment such as lineman's gloves. This process is slow, difficult, and dangerous, especially if the utility worker is at a height to perform the work. Second, telescoping hot sticks can only extend to integer multiples of predetermined lengths according to the lengths of the component poles, i.e., 3 feet, 6 feet, 9 feet, 12 feet, etc. It is difficult or impossible to select and implement more precise extensions using the current state of the art. When utility workers are required to operate in tight or awkward spaces, this can make maintenance work difficult and even dangerous, as the worker is required to select a pole length that is too short, and therefore too close to the electrical components, or too long, and therefore outside of a safe working area.

Thus, a heretofore unaddressed need exists in the industry to address the aforementioned deficiencies and inadequacies.

SUMMARY OF THE DISCLOSURE

Embodiments of the present disclosure provide an apparatus for an electronic telescoping pole. Briefly described, in architecture, one embodiment of the apparatus, among others, can be implemented as follows. An electronic telescoping pole includes a handle. A motor has a power source and is located within the handle. A plurality of nesting tubes is telescopically extendable from the handle. Each tube has a square rib support within the tube. At least one drive belt is in mechanical communication with the motor and the plurality of square rib supports. In a retracted position, the plurality of nesting tubes and square rib supports are nested, one within another. In an extended position, the at least one drive belt is operable upon the plurality of square rib supports to telescopically extend the plurality of nesting tubes.

In one aspect of the apparatus, the power source is a battery removably located at a proximal end of the handle.

In another aspect of the apparatus, a tool is attached to a distal end of one of the plurality of nesting tubes. The tool is at least one selected from the set of: universal tips, disconnect hooks, bucket hooks, rescue hooks, saws and cutters, brushes, grabbing probes, measuring tools and meters, clamp installers, clampsticks, static discharge components, transformer tools, and pigtail sticks.

In another aspect of the apparatus, each square rib support comprises two parallel sidewalls connected by a plurality of rods extending therebetween. In a particular aspect, at least one of the square rib supports further comprises at least two channels each extending along a portion of a corresponding parallel sidewall, and wherein at least a portion of the plurality of rods extends into the at least two channels, thereby slidably connecting at least two adjacent square rib supports. In another particular aspect, at least one of the square rib supports comprises the at least two channels, and wherein a height of the at least two channels on each square rib support is different between successive square rib supports. In another particular aspect, at least one of the square rib supports comprises at least four channels, the channels extending along top and bottom portions of the two parallel sidewalls, and wherein at least a portion of the plurality of rods extends into the at least four channels at front and rear portions of the at least one square rib support, thereby slidably connecting at least two adjacent square rib supports.

In another aspect of the apparatus, the nested square rib supports are arranged in an order from exterior to interior, and wherein a thickness of a square rib support further toward the exterior is greater than a thickness of a square rib support further toward the interior.

In another aspect of the apparatus, one of the plurality of nesting tubes is fixed to the handle and remains stationary during extension and retraction of the remaining nesting tubes. In a particular aspect, the fixed nesting tube is the most exterior nesting tube in the retracted position.

The present disclosure can also be viewed as providing methods of driving a telescoping pole. In this regard, one embodiment of such a method, among others, can be broadly summarized by the following steps: providing a handle connected to a plurality of nesting tubes telescopically extendable from the handle, each tube having a square rib support within the tube; and operating a motor located within the handle to drive at least one drive belt in communication with the motor and the plurality of square rib supports, whereby driving the motor in a first direction is operable upon the plurality of square rib supports to telescopically extend the plurality of nesting tubes, and whereby driving the motor in a second direction is operable upon the plurality of square rib supports to retract the plurality of nesting tubes.

In one aspect of the method, the motor is operable by a battery removably located at a proximal end of the handle.

In another aspect of the method, at least one of the plurality of nesting tubes is extendable to a partial length of the nesting tube.

In another aspect of the method, each square rib support comprises two parallel sidewalls connected by a plurality of rods extending therebetween. In a particular aspect, at least one of the square rib supports further comprises at least two channels each extending along a portion of a corresponding parallel sidewall, and wherein at least a portion of the plurality of rods extends into the at least two channels, thereby slidably connecting at least two adjacent square rib supports. In another particular aspect, at least one of the square rib supports comprises the at least two channels, and wherein a height of the at least two channels on each square rib support is different between successive square rib supports. In another particular aspect, at least one of the square rib supports comprises at least four channels, the channels extending along top and bottom portions of the two parallel sidewalls, and wherein at least a portion of the plurality of rods extends into the at least four channels at front and rear portions of the at least one square rib support, thereby slidably connecting at least two adjacent square rib supports.

In another aspect of the method, the nested square rib supports are arranged in an order from exterior to interior, and wherein a thickness of a square rib support further toward the exterior is greater than a thickness of a square rib support further toward the interior.

In another aspect of the method, a most exterior nesting tube is fixed to the handle and remains stationary during extension and retraction of the remaining nesting tubes. In a particular aspect, a most interior nesting tube is extended first and retracted last of the remaining nesting tubes.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
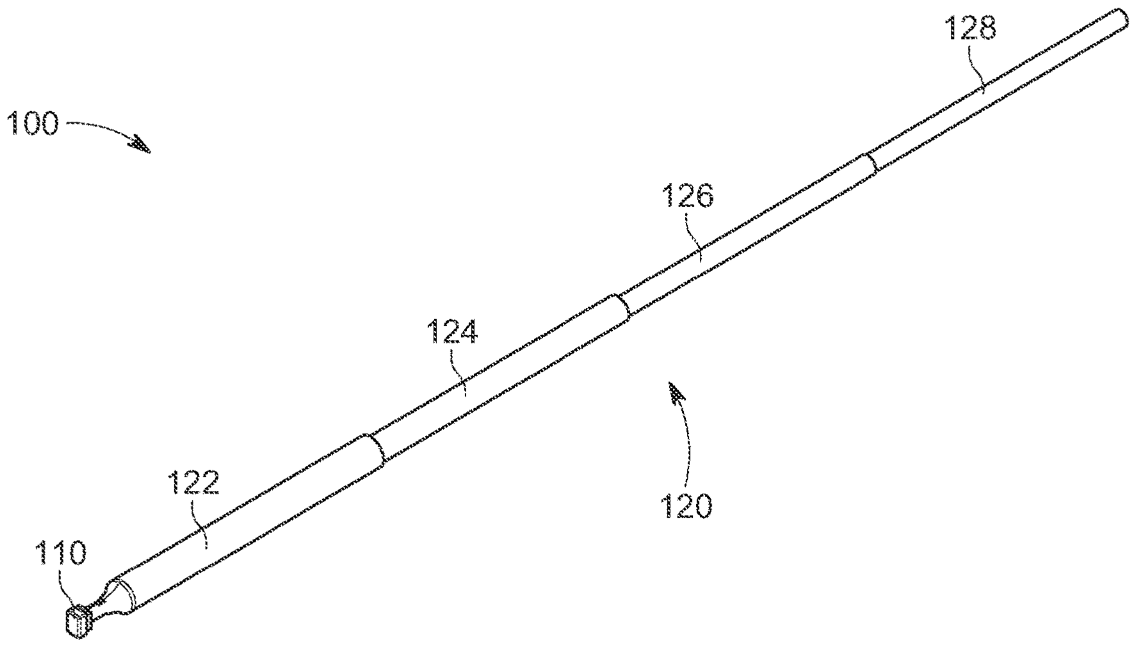
FIG. 1 is a diagrammatic illustration of an electronic telescoping pole, in accordance with a first exemplary embodiment of the present disclosure.

FIG. 1 is a diagrammatic illustration of an electronic telescoping pole 100, in accordance with a first exemplary embodiment of the present disclosure. A number of the internal components may be briefly discussed herein and described in greater detail relative to other figures, below. The electronic telescoping pole 100 includes a handle 110. A motor (not shown) has a power source and is located within the handle 110. A plurality of nesting tubes 120 is telescopically extendable from the handle 110. Each tube 122-128 has a square rib support (not shown) within the tube. At least one drive belt (not shown) is in mechanical communication with the motor and the plurality of square rib supports. In a retracted position, the plurality of nesting tubes 120 and square rib supports are nested, one within another. In an extended position, the at least one drive belt is operable upon the plurality of square rib supports to telescopically extend the plurality of nesting tubes 120.

The electronic telescoping pole 100 (hereinafter "telescoping pole" 100) may include a handle 110. The handle 110 may be sized and shaped to fit within a human hand, i.e., to be operable by one or two human hands while the telescoping pole 100 is in use. The handle 110 may include one or more buttons, switches, knobs, dials, screens, displays, indicators, controls, and the like for operating the telescoping pole. In one example, this may include at least one switch to allow the telescoping pole 100 to be extended, retracted, or held at a desired position. The handle 110 may be formed from an exterior housing and may include interior components therein, including the motor, the related assembly. A power source, such as a battery, may be located within the handle 110 or removably in communication with a portion of the handle 110. The handle 110 and motor are described in greater detail relative to FIGS. 7 and 8, below.

A plurality of nesting tubes 120 is telescopically extendable from the handle 110. The plurality of nesting tubes 120 may include any number of tubes concentrically inserted, one within another. The tubes 120 may be made from any suitable material, for instance, an electrically insulating material. This may include carbon fiber, fiberglass, plastics, ceramics, glass, wood, stone, or any combination thereof. In one example, the tubes 122, 124, 126, 128 may contain an amount of dielectric insulation. The tubes 122, 124, 126, 128 may be rated to insulate against particular voltage levels, and may be suitable for particular types of electrical work. In one example, a fiberglass telescoping pole 100 (where the tubes 122, 124, 126, 128 are made of fiberglass) may be rated to withstand up to 40 kV of electrical voltage. Other materials may have insulation ratings commensurate with their material properties. The tubes 120 may be sized to any suitable length. In one example, every tube 122-128 may have the same length. In another example, one or more tubes 122-128 may have differing lengths. The tubes 120 may be any suitable shape, for instance cylindrical, rectangular, prism, triangular prism, and the like. The thickness or diameter of the tubes 122-128 may be any suitable measure. In one example, the thickness or diameter of the exterior tube 122 may correspond to a thickness or diameter of the handle 110. In operation, the thickness or diameter of the remaining tubes 124, 126, 128 may be successively reduced to allow each tube 124, 126, 128 to nest within an interior cavity of a preceding tube 122, 124, 126.

FIG. 1 shows an exemplary telescoping pole 100 having four tubes 122, 124, 126, 128. The tubes 122, 124, 126, 128 are manufactured from carbon fiber material in a cylindrical shape with equal lengths. The interior diameters of each tube are, as an example, 152.6 mm, 146.6 mm, 140.6 mm, and 134.6 mm (tubes 122, 124, 126, and 128, respectively). The thickness of each tube 122, 124, 126, 128 is equal at about 6 mm. The tubes 122, 124, 126, 128 may be arranged in an order from exterior to interior. Tube 122 is the exterior tube, and in one example does not extend or retract during operation of the telescoping pole 100, but remains fixed in communication with the handle 110.

Exterior tube 122 may be connected to the handle 110 in any suitable manner. For instance, the tube 122, may be affixed in a permanent or semi permanent manner by manufacture as a unitary piece, by adhesive, epoxy, glue, welding and the like, by fasteners such as clips, bolts, screws, rivets, staples, and the like, or in any other manner. In another example, the tube 122 may be removably affixed by any suitable manner such as removable fasteners, by threading, by locking components, and the like. In one example, the plurality of tubes 120 may be replaceable such that a different plurality of tubes 120 may be affixed to the handle 110 as desired by the user. This may allow the user to replace broken or damaged components, load longer telescoping pole tubes, load tubes having different shapes, strengths, or other characteristics, and the like. In one particular example, the handle 110 and exterior tube 122 may be a single, unitary piece housing the other tubes 124, 126, 128, square rib supports, drive belts, motor assembly, and all other components. This may provide improved strength, weatherizing protection, and stability for the telescoping pole 100.

Interior tube 128 may be configured to receive tools, caps, fittings, and other pieces to assist with electrical line work. This is discussed in greater detail relative to FIGS. 9A-9B, below. In one example, interior tube 128 may support a weight related to the tool or other piece. For instance, the supported weight may be up to 4 kilograms in some cases.

Figure 2:
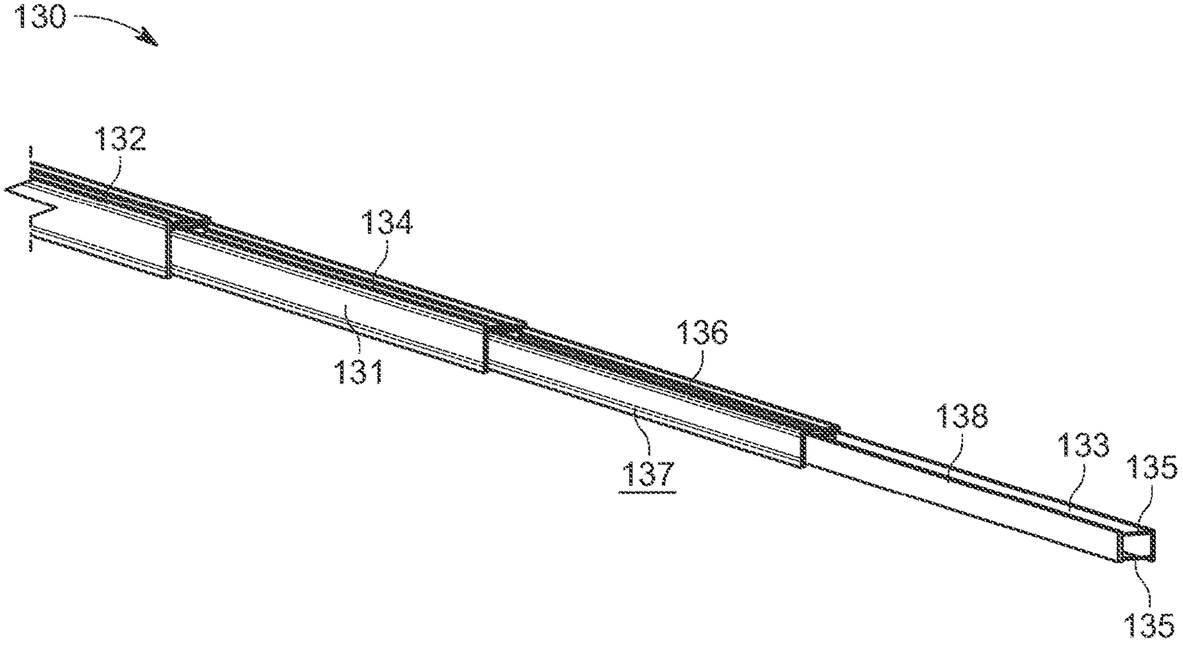
FIG. 2 is an isometric illustration of the square rib supports, in accordance with the first exemplary embodiment of the present disclosure.

FIG. 2 is an isometric illustration of the square rib supports 130, in accordance with the first exemplary embodiment of the present disclosure. Each tube 122-128 has a square rib support 132, 134, 136, 138 within the tube and corresponding to each tube 122, 124, 126, 128, respectively. The square rib supports 132-138 may be made from any of the suitable materials described relative to FIG. 1, above, including any electrically insulated materials, In one example, the length of each square rib support may be the same as its corresponding tube; i.e., square rib support 132 may have a similar length to tube 122, while square rib support 138 may have a similar length to tube 128, and so on. In one example, the thickness or diameter of each square rib support 132-138 may successively decrease to allow the square rib supports to nest, one within another, while the telescoping pole 100 is in a retracted position.

As shown by the example illustrated in FIG. 2, the square rib supports 132-138 may each include structural elements to enable the telescoping pole 100 to operate. In one example each square rib support may include two parallel sidewalls 131, 133. The sidewalls 131, 133 may be connected by a plurality of rods 135 extending perpendicular to the sidewalls 131, 133, forming the “square” shape of the supports. In particular square rib supports, such as support 138, rods 135 at the rear portion of the sidewalls 131, 133 may extend past the sidewalls 131, 133 and into channels 137 in an adjacent square rib support 136. This may allow square rib support 138 to slide out from a nested position within square rib support 136. Particular square rib supports 132, 134, 136 may have channels 137 extending along portions of the sidewalls 131, 133 to accommodate the rods 135 therein. The location of the channels 137 may correspond to the positioning of the rods 135 of the successive square rib support. The length of the channels 137 may be substantially the entirety of the square rib support 132, 134, 136 or some length less than that. In one example, the rods 135 may be positioned at top and bottom portions of the square rib supports 132, 134, 136, 138 and at front and rear portions of the square rib supports 132, 134, 136, 138. The example illustrated in FIG. 2 indicates four rods 135 in each square rib support 132-138. In one example, more or fewer rods 135 may be used. Likewise, the sidewalls 131, 133 may each have a channel 137 corresponding to a rod 135 at the top and a rod 135 at the bottom. The example illustrated in FIG. 2 indicates four channels 137 in square ribs 132, 134, and 136.

The square rib supports 130 may be nested, one within another, when the telescoping pole 100 is in a retracted position. The nested square rib supports 130 may be arranged in an order from exterior to interior, in a manner corresponding to the tubes 122-128. In one example, each successively more interior square rib support 134, 136, 138 may have a thickness smaller than the previously more exterior square rib support 132, 134, 136 in order to allow this nesting in operation. For instance, the exterior square rib support 132 may have the largest thickness or width dimensions, followed by the next square rib support 134, and the next square rib support 136, and the next square rib support 138, and so on. In operation, the position of the channels 137 in each square rib support 132-136 may be offset, one from another, to accommodate the nesting of the square rib supports 132-138 within the telescoping pole 100. For example, the channels 137 in the exterior square rib support 132 may be positioned at a higher position relative to the channels 137 of the next square rib support 134, which may be higher than the channels 137 of the next square rib support 136, and so on. This may allow all of the channels 137 and rods 135 to fit within the nested volume when the square rib supports 130 are in the retracted position.

In one example, the width and/or thickness measurement of the square rib supports 130 may be determined by the diameter of the interior tube 128. That is, all of the square rib supports 130 may be sized to fit within the diameter of the interior tube 128 when the telescoping pole 100 is in the retracted position. Thus, the exterior square rib support 132 may have a width or thickness no larger than what is suitable for the exterior square rib support 132 to fit within the interior tube 128. This is discussed in greater detail with respect to FIG. 6, below.

Figure 3:
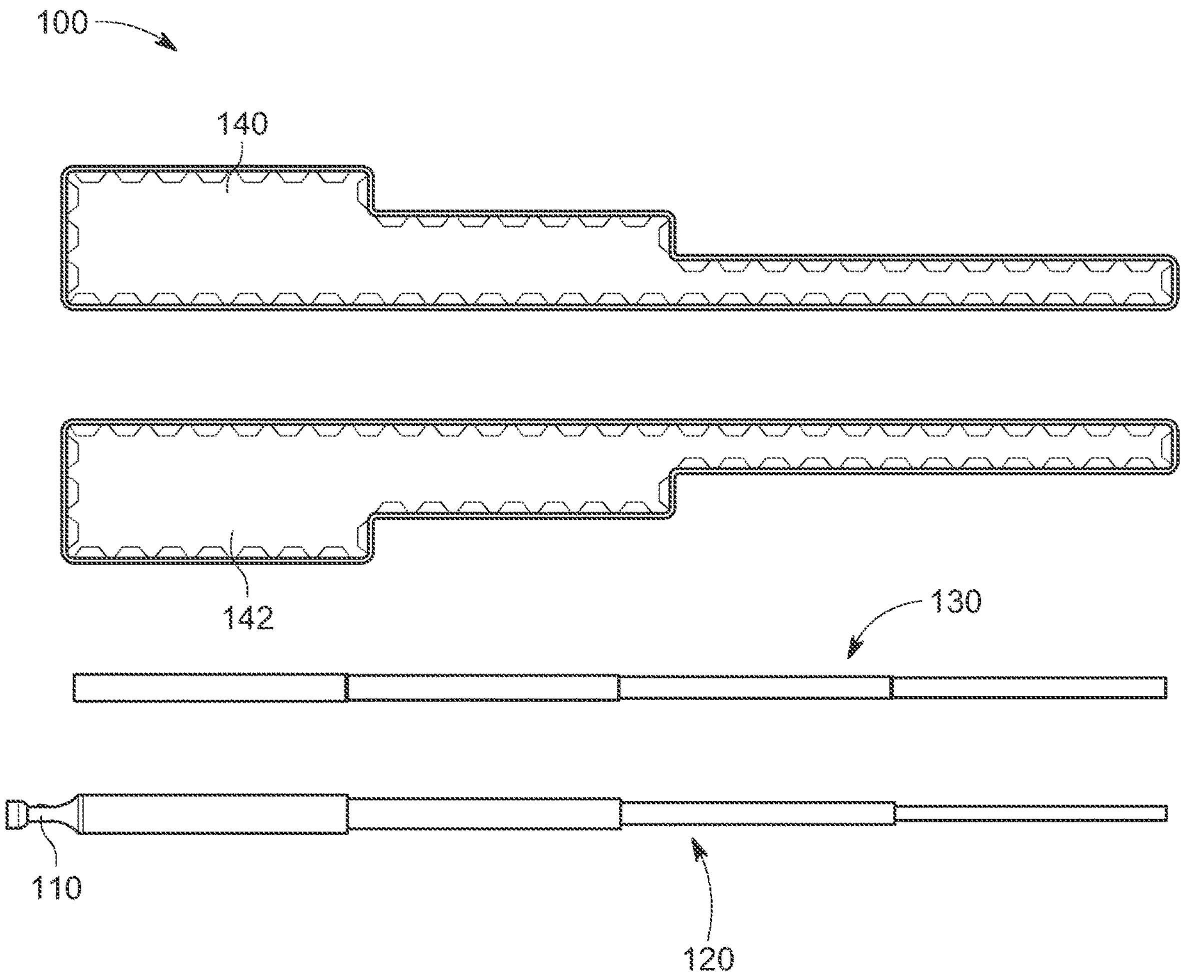
FIG. 3 is a partially exploded view of the electronic telescoping pole, in accordance with the first exemplary embodiment of the present disclosure.

FIG. 3 is a partially exploded view of the electronic telescoping pole 100, in accordance with the first exemplary embodiment of the present disclosure. FIG. 3 may be further understood with reference to FIGS. 1-2, above. The handle 110 and plurality of nesting tubes 120 are shown connected together in an extended position. The plurality of square rib supports 130 are shown exploded from within the interior of the nesting tubes 120 and connected together in an extended position. FIG. 3 also shows two drive belts 140, 142 exploded out of the interior of the handle 110 and the nesting tubes 120 and square rib supports 130. In operation, at least one drive belt 140, 142 may be used. For ease of discussion, reference will be made to the exemplary two drive belts 140, 142, shown in FIG. 3.

The drive belts 140, 142 may be in mechanical communication with the motor and the plurality of square rib supports. For simplicity of illustration, this mechanical communication is not illustrated relative to FIG. 3. However, the mechanical communication may be performed in any suitable manner. In one example, the drive belts 140, 142 may be fed around one or more gears within the handle 110. The gears may be in mechanical communication with the motor and may be selected and operated to provide any desired mechanical advantage or other mechanical characteristics. This is discussed in greater detail relative to FIG. 8, below. Within the plurality of square rib supports 130, the drive belts 140, 142 may be fed around one or more gears and/or pulleys located within the square rib supports 132, 134, 136, 138, which may be operable to slide the square rib supports 134, 136, 138 when the gears and/or pulleys are turned. The drive belts 140, 142 may be driven by the motor according to the operation of the user. As they are being driven, the drive belts 140, 142 may operate on the gears and/or pulleys to turn and thereby slide the square rib supports 134, 136, 138. As the square rib supports 134, 136, 138 slide outward and away from the handle 110, each rib may pull a corresponding tube 124, 126, 128 outward and away from the handle 110 as well. In one example, each square rib support 132, 134, 136, 138 may be connected to a corresponding tube 122, 124, 126, 128, respectively by any suitable manner. In this way, the operation of the drive belts 140, 142 may cause the square rib supports 130 and the tubes 120 to extend away from the handle 110 into an extended position. In the same way, the reverse operation of the drive belts 140, 142 may cause the square rib supports 130 and the tubes 120 to retract toward the handle 110 into a retracted position. The drive belts 140, 142 may be driven in an opposite direction, which may cause the gears and/or pulleys connected to the square rib supports 134, 136, 138 to rotate in the other direction. This rotation may cause the square rib supports 134, 136, 138 to slide back toward the handle 110, which in turn may cause the corresponding poles 124, 126, 128 to slide back toward the handle 110.

The drive belts 140, 142 may be made from any suitable materials, including plastics or polymers such as ABS, HIPS, nylon, PLA, polycarbonate, polypropylene, and the like. The drive belts 140, 142 may include characteristics common to other drive belts such as ridges, v shapes, and the like. FIG. 3 shows two drive belts 140, 142 in use with the telescoping pole 100. In operation, the drive belts 140, 142 may be positioned opposite one another within the square rib supports 130. For instance, a first drive belt 140 may be positioned along a left side of the square rib supports 130, while a second drive belt 142 may be positioned along a right side of the square rib supports 130. Alternatively, the drive belts 140, 142 may be positioned along top and bottom sides of the square rib supports 130. The example illustrated in FIG. 3 shows two drive belts 140, 142 in order to provide more equally-dispersed drive power to the telescoping pole 100. However, it should be understood that any number and configuration of drive belts may be considered part of this disclosure.

Figure 4A:
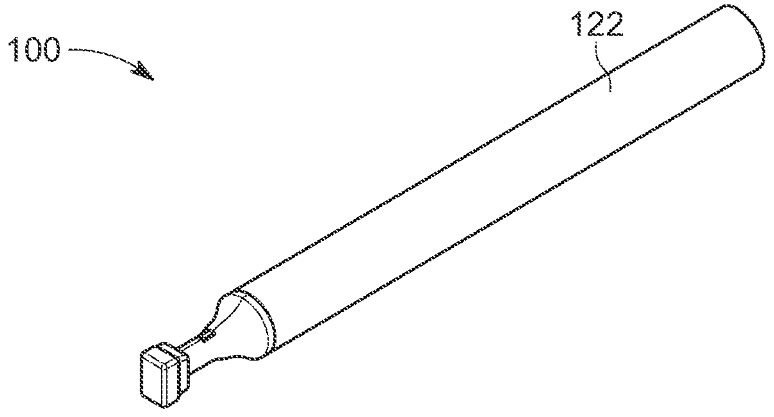
FIGS. 4A-4B are diagrammatic illustrations showing the electronic telescoping pole in a retracted position and in an extended position, in accordance with the first exemplary embodiment of the present disclosure.
Figure 4B:
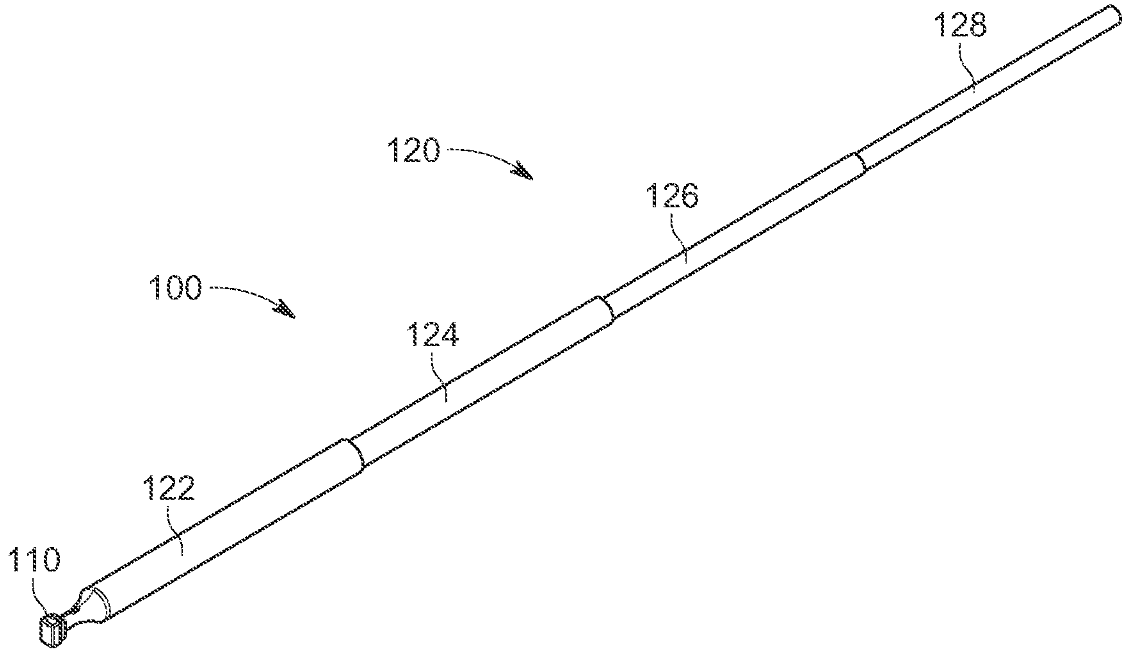

FIGS. 4A-4B are diagrammatic illustrations showing the electronic telescoping pole 100 in a retracted position and in an extended position, in accordance with the first exemplary embodiment of the present disclosure. In the retracted position, the plurality of nesting tubes 120 and square rib supports are nested, one within another. The exterior tube 122 may be fixed in position and may remain the only tube visible. In the extended position, the at least one drive belt 140, 142 is operable upon the plurality of square rib supports 130 to telescopically extend the plurality of nesting tubes 120.

In operation, the telescoping pole 100 may extend from the retracted position shown in FIG. 4A to the extended position shown in FIG. 4B. The interior tube 128 may be the first tube to extend away from the handle 110, followed by the next tube 126, then the next tube 124. In one example, each tube 124, 126, 128 may extend fully out from within the exterior tube 122 before the next successive tube 124, 126 begins extending. In another example, the tubes 124, 126, 128 may extend at the same time. The telescoping pole 100 may be extended to any desired length, including wholly extended, wholly retracted, or any length in between. In one example, desired lengths may be selected, entered, or programmable on the telescoping pole 100. Certain lengths may cause the tubes 124, 126, 128 to only extend partially out from within adjacent tubes 122, 124, 126. The telescoping pole 100 may be locked at a desired length by selection of a switch or by manual lock.

In retracting, the telescoping pole 100 may exhibit any of these characteristics in the reverse direction, i.e., tube 124 may begin retracting first, then tube 126, then interior tube 128. Alternatively, interior tube 128 may retract first, followed by tube 126, then tube 124. The user may select any desired length for retraction, including full retraction or some partial retraction, which may be programmable depending on the job or nature of the work.

It should be understood that the examples described and illustrated herein are not intended to be limiting. Any suitable number, configuration, size, length, and combination of components may be understood to be within the scope of this disclosure. For example, any suitable number of tube sections 120, including fewer or more than the four sections illustrated, may be used. In one particular example the number of tube sections used may include any number of sections between 2 and 10, inclusive (i.e., may include 2, 3, 4, 5, 6, 7, 8, 9, or 10 sections). The tube sections 120 may collectively extend to any desired length, which may be shorter or longer than the length of the telescoping pole 100 illustrated. The individual tubes 122-128 may each have any suitable individual length, thickness, diameter, material composition, and the like, including those different from what has been illustrated. Likewise, the number, length, dimensions, and material compositions of the square rib supports 132-138 may be different from what is illustrated.

Figure 5A:
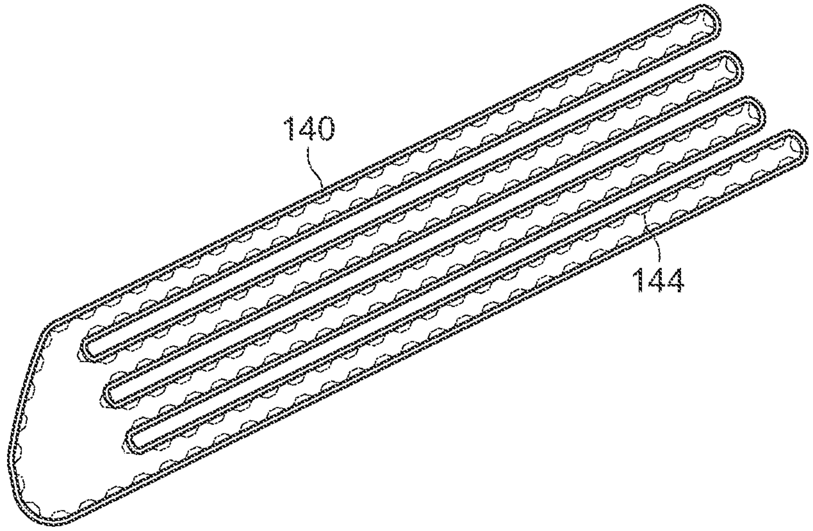
FIGS. 5A-5B are diagrammatic illustrations showing the drive belt in a retracted position and in an extended position, in accordance with the first exemplary embodiment of the present disclosure.
Figure 5B:
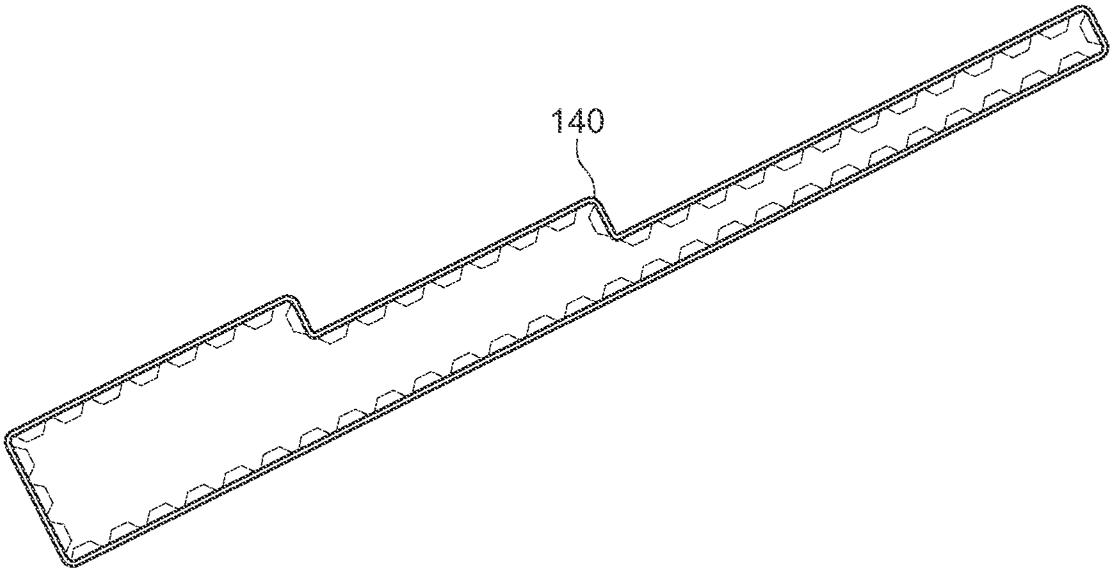

FIGS. 5A-5B are diagrammatic illustrations showing the drive belt 140 in a retracted position and in an extended position, in accordance with the first exemplary embodiment of the present disclosure. It should be understood that the illustrations have been simplified for ease of view, and that gears, pulleys, and other mechanical components are not shown. However, one of skill in the relevant art will understand the operation of these components as described herein.

FIG. 5A shows the drive belt 140 in a retracted position. In this position, the length of the drive belt 140 is fed through and around a number of gears and/or pulleys as described above. At certain points along the drive belt 140 where the drive belt 140 comes into contact with the gears and/or pulleys, referred to herein as pulley points 144, the drive belt 140 may be folded in on itself, creating a plurality of vertical loops when the telescoping pole 100 is retracted. This may allow the footprint of the telescoping pole 100 to be small while the drive belt 140 remains in tight mechanical communication with the gears and/or pulleys.

FIG. 5B shows the drive belt 140 in an extended position. In this position, the length of the drive belt 140 is fully extended and fed through and around the gears and/or pulleys without the plurality of vertical loops shown in FIG. 5A. When extending, the drive belt 140 may be driven around to pull the gears and/or pulleys as is known with drive belts. The turning of the gears and/or pulleys may cause the square rib supports 134, 136, 138 to extend away from the handle 110, which may in turn cause the loops of the drive belt 140 to extend away from the vertically-stacked retracted position, one at a time. When retracting, this process may be mechanically reversed.

It should be understood that any number and type of other drive belts, including drive belt 142 described relative to FIG. 3, above, may operate in the same way.

Figure 6:
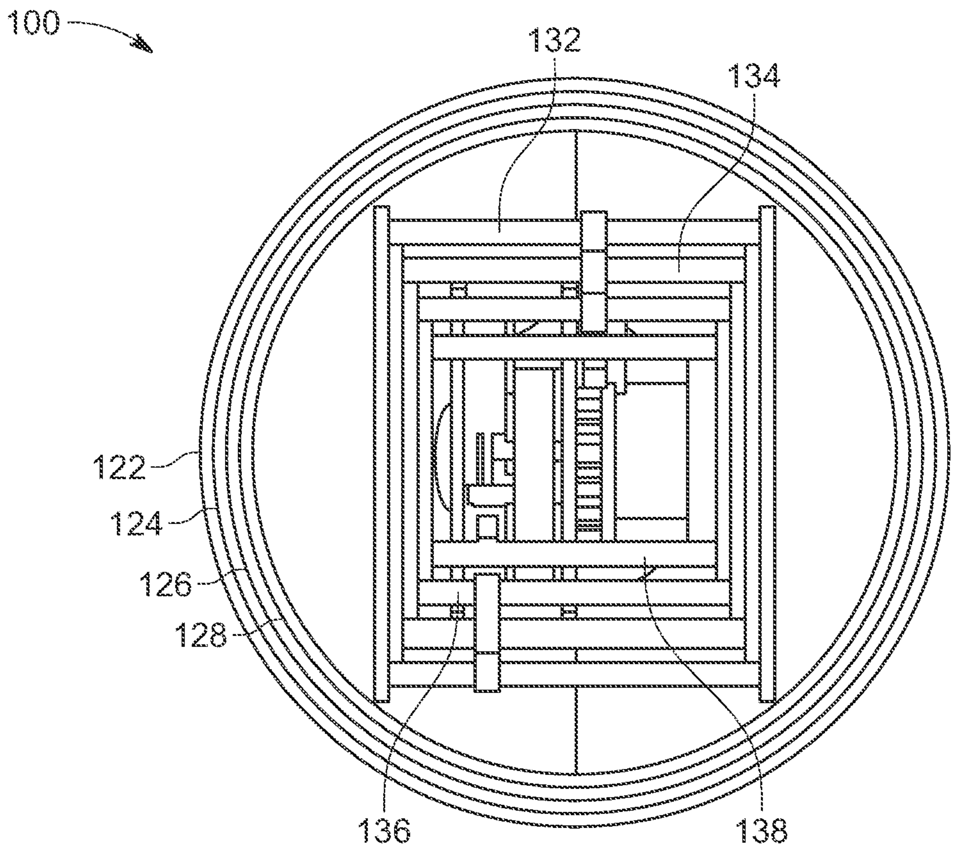
FIG. 6 is a front view illustration of the electronic telescoping pole, in accordance with the first exemplary embodiment of the present disclosure.

FIG. 6 is a front view illustration of the electronic telescoping pole 100, in accordance with the first exemplary embodiment of the present disclosure. FIG. 6 shows the tubes 122, 124, 126, 128 arranged concentrically and nested together in a retracted position. The square rib supports 132, 134, 136, 138 are arranged nested together in a retracted position within the interior tube 128.

Figure 7:
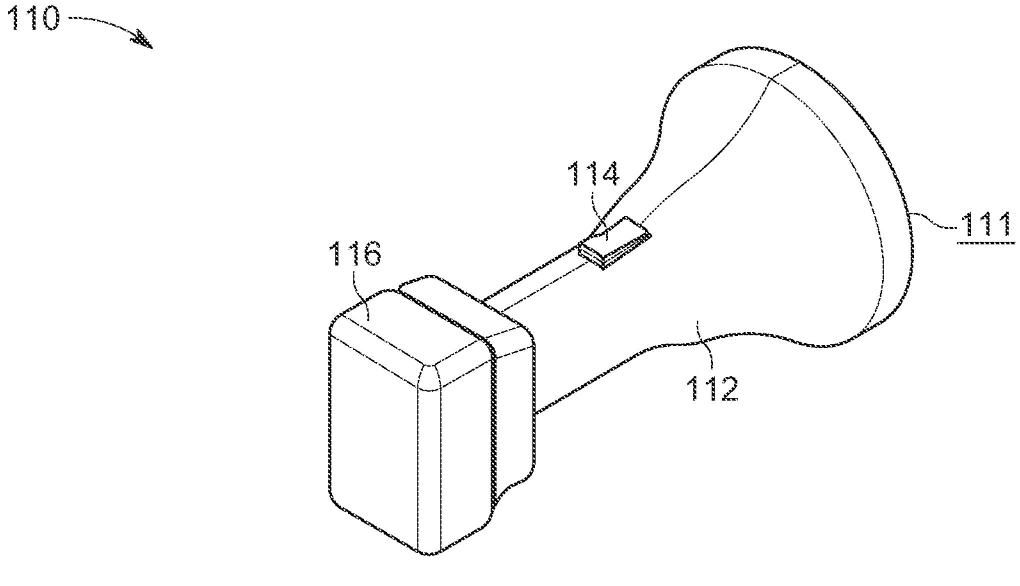
FIG. 7 is an isometric illustration of the handle, in accordance with the first exemplary embodiment of the present disclosure.

FIG. 7 is an isometric illustration of the handle 110, in accordance with the first exemplary embodiment of the present disclosure. In one example, the handle 110 may comprise an exterior housing 112 sized and shaped to fit into a human hand. At least one operating component may be accessible from the exterior housing 112. In the example shown in FIG. 7, the operating component may be a switch 114 which may include settings to advance, retract, and/or maintain the position of the nested tubes 120 and the square rib supports 130. In operation, the exterior housing 112 of the handle 110 may be grasped like a flashlight and the switch 114 may be operated with the user's thumb.

The handle 110 may be made from any suitable material or combinations of materials. In one example, this may include insulating materials such as those described above relative to FIG. 1. In another example, the handle 110 may include textured portions to improve the grippable characteristics of the handle 110 as it is held in the user's hand. These may include textured portions that provide additional surface area for increased contact, portions that utilize softer materials for improved grip, and the like.

An interior cavity 111 within the exterior housing 112 may include the motor, mechanical assembly, and electrical components necessary to operate the telescoping pole 100. The handle 110 may include a power source 116 in electrical communication with the motor and other electrical components. In one example, the power source 116 may be located at a proximal end of the handle 110. In one particular example, the power source 116 may be a battery, and may be removably connectable to the handle 110. For instance, 18 v batteries commonly used in cordless power tools such as drills, impact drivers, leaf blowers, and the like may be inserted into a receiving cavity within the handle 110. The batteries may be recharged separately from the telescoping pole 100 and may be hot swapped as needed. It should be understood that other power sources 116 may be included within the scope of this disclosure as well, including permanent batteries, disposable batteries, external power sources such as generators, automobile convertors, electrical grid sources, solar panels, and the like.

Other switches and means of operating the telescoping pole 100 may be included within the handle and operable therefrom. In one example, additional switches, buttons, flaps, keys, indicators, displays, and the like may be positioned on the exterior housing 112 for operation or use by the user. These additional components may allow the user to control additional characteristics of the telescoping pole 100, such as the rate of extension or retraction, the direction of movement, the amount of extent of extension or retraction, and the like. Displays and indicators may indicate to the user that a particular option has been selected, or that a particular length has been reached during extension or retraction. For instance, if a user desires to extend the telescoping pole 100 to a distance of 10 feet, an indicator may communicate that the extended distance has been reached. The indicator may be any of visual, auditory, or tactile, or any combination thereof. In one example, a switch or button may allow the user to turn the telescoping pole 100 on and off.

Figure 8:
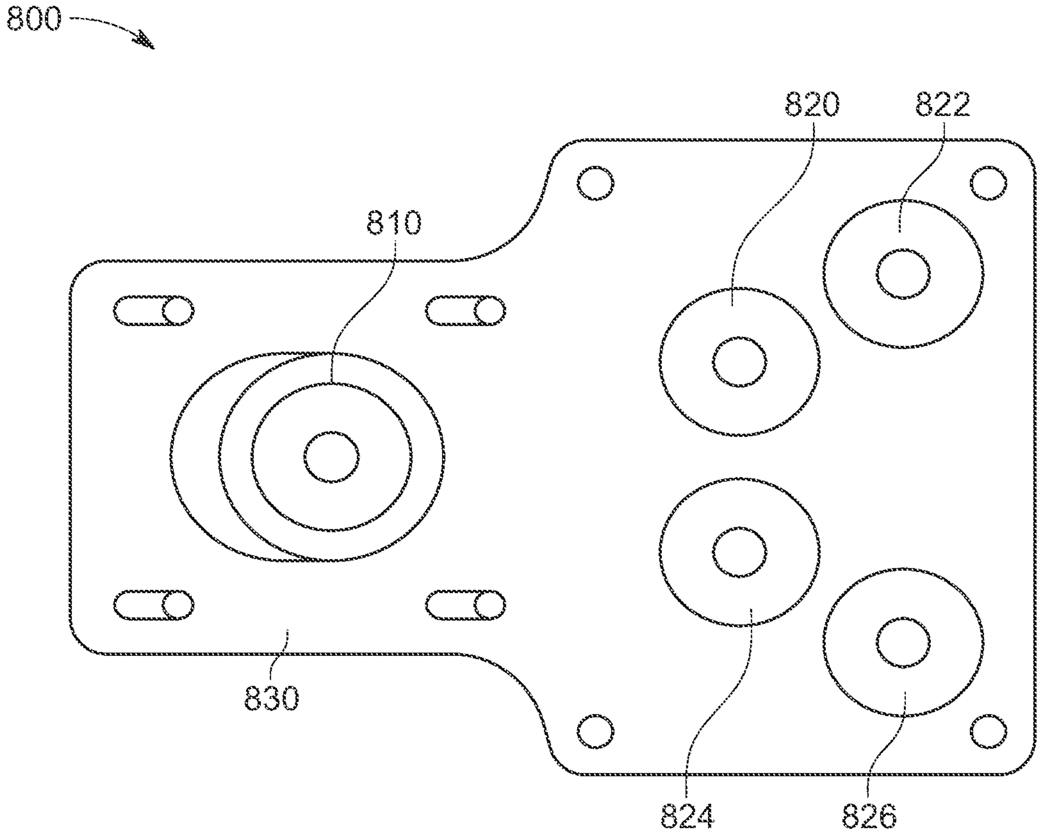
FIG. 8 is a schematic illustration of the motor assembly, in accordance with the first exemplary embodiment of the present disclosure.

FIG. 8 is a schematic illustration of the motor assembly 800, in accordance with the first exemplary embodiment of the present disclosure. The motor assembly 800 may include a motor 810 and a plurality of gears 820, 822, 824, 826 along with a support 830 against which all of these components may be affixed. As described above, the motor assembly 800 may be located within the handle 110. The motor 810 may be any suitable motor, including an electric stepper motor capable of operating at precise incremental periods. In one example, the motor 810 may be operable in two directions to enable extension and retraction of the telescoping pole 100. In another example, the motor 810 may operate in a single direction and the switch between extension and retraction may be accomplished through mechanical switching. The motor 810 may operate at any suitable power rating to handle any required load. In one example, the motor 810 may be rated to operate at a maximum of at least 4 newtons. The plurality of gears 820, 822, 824, 826 may include any type, number, size, orientation, combination, placement, and operation of gears necessary to achieve the desired mechanical advantage. In one example, a bicameral system of gears 820, 822, 824, 826 may be used in order to control drive the two drive belts 140, 142 simultaneously and evenly. It should be understood that various other necessary components, including belts, fasteners, and the like, are not shown in FIG. 8 for ease in the illustration.

Figure 9A:
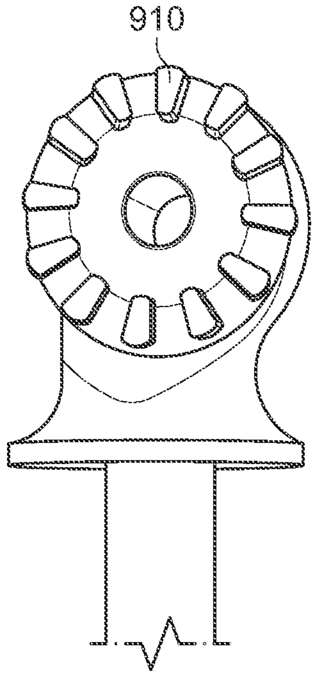
FIGS. 9A-9B are diagrammatic illustrations of tools that may be attached at the distal end of the electronic telescoping pole, in accordance with the first exemplary embodiment of the present disclosure.
Figure 9B:
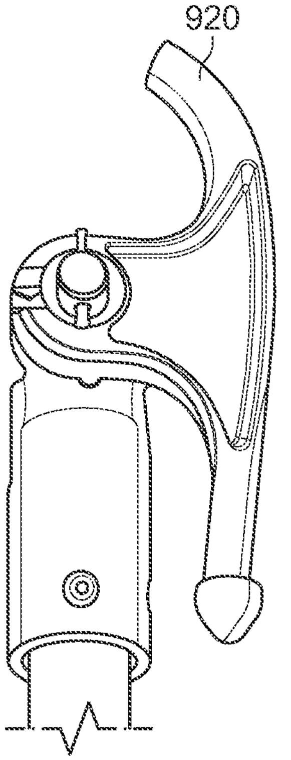

FIGS. 9A-9B are diagrammatic illustrations of tools that may be attached at the distal end of the electronic telescoping pole 100, in accordance with the first exemplary embodiment of the present disclosure. FIG. 9A shows a universal tip 910 that may be attached to the telescoping pole 100 in order to accommodate other tools, ends, devices, and the like. The universal tip 910 may include a plate with a series of grooves that allow the attached elements to be angled at any desired orientation. The universal tip 910 may be attached by any suitable means, including by threading, fasteners such as screws, pins, and bolts, adhesives, by unitary manufacture with the tube 128, or by any other suitable means.

FIG. 9B shows an exemplary tool that may be attached to the universal tip 910, a disconnect hook 920. The disconnect hook 920 may be operated by a user along with the telescoping pole 100 to manipulate live power lines and components thereof. The disconnect hook 920 may be attached and oriented at any desired angle via the universal tip 910. The example shown in FIG. 9B is by way of illumination, and is not meant to be limiting. Any other suitable tools, ends, devices, and the like may be attached and used along with the telescoping pole 100 as is known in the art. For example, this may include bucket hooks, rescue hooks, saws and cutters, brushes, grabbing probes, measuring tools and meters, clamp installers, clampsticks, static discharge components, transformer tools, pigtail sticks, and the like.

Figure 10:
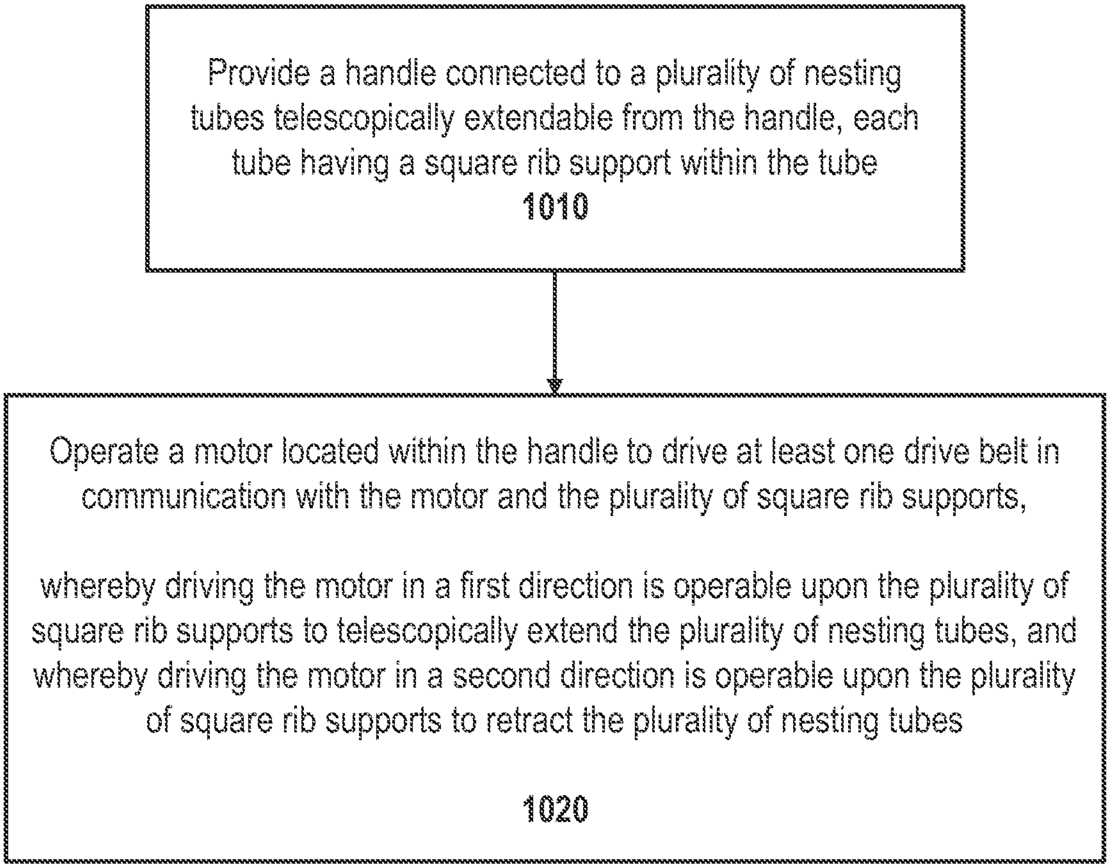
FIG. 10 is a flowchart illustrating a method of driving a telescoping pole, in accordance with the first exemplary embodiment of the present disclosure.

FIG. 10 is a flowchart illustrating a method of driving a telescoping pole, in accordance with the first exemplary embodiment of the present disclosure. It should be noted that any process descriptions or blocks in flow charts should be understood as representing modules, segments, or steps that include one or more instructions for implementing specific logical functions in the process, and alternate implementations are included within the scope of the present disclosure in which functions may be executed out of order from that shown or discussed, including substantially concurrently or in reverse order, depending on the functionality involved, as would be understood by those reasonably skilled in the art of the present disclosure.

Step 1010 includes providing a handle connected to a plurality of nesting tubes telescopically extendable from the handle, each tube having a square rib support within the tube.

Step 1020 includes operating a motor located within the handle to drive at least one drive belt in communication with the motor and the plurality of square rib supports, whereby driving the motor in a first direction is operable upon the plurality of square rib supports to telescopically extend the plurality of nesting tubes, and whereby driving the motor in a second direction is operable upon the plurality of square rib supports to retract the plurality of nesting tubes.

It should be emphasized that the above-described embodiments of the present disclosure, particularly, any "preferred" embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

What is claimed is:

1. An electronic telescoping pole, comprising:
- a handle;
- a motor having a power source and located within the handle;
- a plurality of nesting tubes telescopically extendable from the handle, each tube having a square rib support within the tube; and
- at least one drive belt in mechanical communication with the motor and the plurality of square rib supports,
  - wherein, in a retracted position, the plurality of nesting tubes and square rib supports are nested, one within another, and
  - wherein, in an extended position, the at least one drive belt is operable upon the plurality of square rib supports to telescopically extend the plurality of nesting tubes.

2. The electronic telescoping pole of claim 1, wherein the power source is a battery removably located at a proximal end of the handle.

3. The electronic telescoping pole of claim 1, further comprising a tool attached to a distal end of one of the plurality of nesting tubes, wherein the tool is at least one selected from the set of: universal tips, disconnect hooks, bucket hooks, rescue hooks, saws and cutters, brushes, grabbing probes, measuring tools and meters, clamp installers, clampsticks, static discharge components, transformer tools, and pigtail sticks.

4. The electronic telescoping pole of claim 1, wherein each square rib support comprises two parallel sidewalls connected by a plurality of rods extending therebetween.

5. The electronic telescoping pole of claim 4, wherein at least one of the square rib supports further comprises at least two channels each extending along a portion of a corresponding parallel sidewall, and wherein at least a portion of the plurality of rods extends into the at least two channels, thereby slidably connecting at least two adjacent square rib supports.

6. The electronic telescoping pole of claim 5, wherein at least one of the square rib supports comprises the at least two channels, and wherein a height of the at least two channels on each square rib support is different between successive square rib supports.

7. The electronic telescoping pole of claim 5, wherein at least one of the square rib supports comprises at least four channels, the channels extending along top and bottom portions of the two parallel sidewalls, and wherein at least a portion of the plurality of rods extends into the at least four channels at front and rear portions of the at least one square rib support, thereby slidably connecting at least two adjacent square rib supports.

8. The electronic telescoping pole of claim 1, wherein the nested square rib supports are arranged in an order from exterior to interior, and wherein a thickness of a square rib support further toward the exterior is greater than a thickness of a square rib support further toward the interior.

9. The electronic telescoping pole of claim 1, wherein one of the plurality of nesting tubes is fixed to the handle and remains stationary during extension and retraction of the remaining nesting tubes.

10. The electronic telescoping pole of claim 9, wherein the fixed nesting tube is the most exterior nesting tube in the retracted position.

11. A method of driving a telescoping pole, comprising the following steps:
- providing a handle connected to a plurality of nesting tubes telescopically extendable from the handle, each tube having a square rib support within the tube; and
- operating a motor located within the handle to drive at least one drive belt in communication with the motor and the plurality of square rib supports,
  - whereby driving the motor in a first direction is operable upon the plurality of square rib supports to telescopically extend the plurality of nesting tubes, and
  - whereby driving the motor in a second direction is operable upon the plurality of square rib supports to retract the plurality of nesting tubes.

12. The method of claim 11, wherein the motor is operable by a battery removably located at a proximal end of the handle.

13. The method of claim 11, wherein at least one of the plurality of nesting tubes is extendable to a partial length of the nesting tube.

14. The method of claim 11, wherein each square rib support comprises two parallel sidewalls connected by a plurality of rods extending therebetween.

15. The method of claim 14, wherein at least one of the square rib supports further comprises at least two channels each extending along a portion of a corresponding parallel sidewall, and wherein at least a portion of the plurality of rods extends into the at least two channels, thereby slidably connecting at least two adjacent square rib supports.

16. The method of claim 15, wherein at least one of the square rib supports comprises the at least two channels, and wherein a height of the at least two channels on each square rib support is different between successive square rib supports.

17. The method of claim 15, wherein at least one of the square rib supports comprises at least four channels, the channels extending along top and bottom portions of the two parallel sidewalls, and wherein at least a portion of the plurality of rods extends into the at least four channels at front and rear portions of the at least one square rib support, thereby slidably connecting at least two adjacent square rib supports.

18. The method of claim 11, wherein the nested square rib supports are arranged in an order from exterior to interior, and wherein a thickness of a square rib support further toward the exterior is greater than a thickness of a square rib support further toward the interior.

19. The method of claim 11, wherein a most exterior nesting tube is fixed to the handle and remains stationary during extension and retraction of the remaining nesting tubes.

20. The method of claim 19, wherein a most interior nesting tube is extended first and retracted last of the remaining nesting tubes.

* * * * *